(12) United States Patent
Arnold et al.

(10) Patent No.: US 12,198,580 B2
(45) Date of Patent: Jan. 14, 2025

(54) EXTERNALLY-MOUNTED OSCILLATING DISPLAY APPARATUS AND METHODS OF USE THEREOF

(71) Applicant: Jade Property, LLC, Longmont, CO (US)

(72) Inventors: Marc Arnold, Longmont, CO (US); Dana Schwartz, Boulder, CO (US)

(73) Assignee: Jade Property, LLC, Longmont, CO (US)

( * ) Notice: Subject to any disclaimer, the term of this patent is extended or adjusted under 35 U.S.C. 154(b) by 169 days.

(21) Appl. No.: 18/101,962

(22) Filed: Jan. 26, 2023

(65) Prior Publication Data

US 2023/0245598 A1 Aug. 3, 2023

Related U.S. Application Data

(60) Provisional application No. 63/304,407, filed on Jan. 28, 2022.

(51) Int. Cl.
| | |
|---|---|
| *G09F 1/00* | (2006.01) |
| *B60R 11/00* | (2006.01) |
| *G09F 7/22* | (2006.01) |
| *G09F 21/04* | (2006.01) |
| *G09F 7/18* | (2006.01) |

(52) U.S. Cl.
CPC ............... *G09F 7/22* (2013.01); *B60R 11/00* (2013.01); *G09F 21/048* (2013.01); *B60R 2011/004* (2013.01); *B60R 2011/0059* (2013.01); *B60R 2011/0085* (2013.01); *G09F 2007/1865* (2013.01)

(58) Field of Classification Search
CPC ....... G09F 15/0087; G09F 21/04; G09F 15/00
See application file for complete search history.

(56) References Cited

U.S. PATENT DOCUMENTS

| | | | | | |
|---|---|---|---|---|---|
| 2,047,377 | A | * | 7/1936 | Liwschutz | A63H 11/10 446/190 |
| 2,576,209 | A | * | 11/1951 | Berger | A01M 29/06 43/3 |
| 2,788,762 | A | * | 4/1957 | Wright | A01M 29/16 116/22 A |
| 3,983,647 | A | * | 10/1976 | Stubbmann | A63H 29/02 40/430 |
| 4,094,092 | A | * | 6/1978 | Bunin | A63H 3/14 446/341 |
| 4,573,427 | A | * | 3/1986 | Konzak | A01M 29/06 116/22 A |
| D384,598 | S | * | 10/1997 | Park | D11/131 |
| 8,230,624 | B2 | * | 7/2012 | Sapp | B42D 15/027 40/446 |

(Continued)

*Primary Examiner* — Shin H Kim
(74) *Attorney, Agent, or Firm* — Berg Hill Greenleaf Ruscitti LLP

(57) ABSTRACT

The invention includes a novel oscillating display device, system, and assembly configured to be mounted to an external surface and allow dynamic oscillation movement of a personalized display in response to an external force, such as air flow generated by the movement of a vehicle, while maintaining the display in an approximately horizontal position relative to an external viewer. The oscillating display of the invention may further include one or more marketing messages or advertisements to be displayed to a viewer.

20 Claims, 13 Drawing Sheets

(56) References Cited

U.S. PATENT DOCUMENTS

| | | | | |
|---|---|---|---|---|
| 9,248,688 B1* | 2/2016 | Mayer | .................. | B42D 15/027 |
| 2002/0162258 A1* | 11/2002 | Anderson | ............... | G09F 21/04 |
| | | | | 428/31 |
| 2003/0192217 A1* | 10/2003 | Anderson | ............... | G09F 21/04 |
| | | | | 40/591 |
| 2009/0126239 A1* | 5/2009 | Clegg | ....................... | G09F 1/00 |
| | | | | 40/407 |
| 2023/0245598 A1* | 8/2023 | Arnold | .................... | G09F 17/00 |
| | | | | 40/409 |

\* cited by examiner

EXTERNALLY-MOUNTED OSCILLATING DISPLAY APPARATUS AND METHODS OF USE THEREOF

CROSS REFERENCES TO RELATED APPLICATION

This application claims the benefit of and priority to U.S. Provisional Application No. 63/304,407, filed Jan. 28, 2022. The entire specification and figures of the above-referenced application is hereby incorporated in its entirety by reference.

TECHNICAL FIELD

The invention relates generally to the field of marketing and advertising displays, and in particular an externally mounted display that includes dynamic oscillating movement in response to flowing air. In one preferred aspect of the invention, the invention relates generally to the field of educational novelty items, and in particular an externally mounted toy, or other novelty item, that can be attached to an external surface, such as a vehicle window, that includes dynamic oscillating movement in response to flowing air.

BACKGROUND

The need and desire to display marketing or promotional messages as a form of commercial or personal expression has long been recognized. Particularly, it has long been recognized that while it is desirable to be able to display messages to other individuals, it is also important to be able to draw or capture the attention of the people for whom the message is directed. Since different individuals or entities may want to display or draw attention to drastically different messages and subject matter, there is a need for a system that allows for the creation of personalized commercial and personal messages. Moreover, most marketing and advertising displays are static in nature and can be easily overlooked or disregarded by the viewer. As a result, there is a further need for a simple, cost-effective system to present commercial and personal displays that incorporate movement and are further configured to be adapted to a variety of different positions so as to maximize the opportunity for viewer to see, and recognize the display.

One solution to the problems identified above is to include marketing or promotional message display on vehicles that can be moved to different locations depending on the need for visibility, or to account for specific events and the like. However, prior attempts in the art to address these concerns have been incomplete at best. For example:

US2013019795A1, by Leptien at al., teaches an assembly for flying a flag at high speeds that includes a pole. First and second wing assemblies are coupled to the pole and extend away from the pole angled in the direction of the back of the pole. The first wing assembly includes a first slot through the first wing assembly. The second wing assembly includes a second slot through the second wing assembly. The first and second slots are parallel to the pole. However, this system only provides movement with respect to the predictable movement of the flag in response to air flow. Moreover, this system is limited to the presentation of flags and other similar cloth or fabric banners.

U.S. Pat. No. 9,454,922B1 by Christopher et al, describes a car flag support which attaches to the upper edge of a car window. The flag support defining an angle of about 22.5 degrees before the flag support post and the window brace portion of the support. The angle, dimensions and reinforcement regions allow the flag support to be used with window visors which extend along the upper window edge of a vehicle window. However, this system also provides only the predictable movement of a flag in response to air flow. Again, this system is limited to the presentation of flags and other similar cloth or fabric banners.

US2012161669A1 by Lorentz et al., describes a flag support assembly for a vehicle, the flag support assembly includes a base attaching the flag support assembly to the vehicle and a stanchion comprising a first end and a second end, wherein the second end of the stanchion is attached to the base. An illumination source is at least partially positioned in the stanchion, wherein the illumination source is oriented to direct a divergent light beam substantially upwards and away from the base. An illumination circuit is electrically coupled to the illumination source and provides power to the illumination source. Again, this system only provides the predictable movement of the flag in response to air flow. Moreover, this system is limited to the presentation of flags and other similar cloth or fabric banners, and requires an additional lighting system that must be powered in order to be effective, and could easily be broken in the external environment of a vehicle moving at a high rate of speed rendering the device unsuitable for continued use.

US2009246419A1 by Lobek et al., describes an ornament for mounting on vehicle antennas and similar elongate upright structures, which move in response to a flow of air, and a range of different ornaments of this type. However, this device operates similar to a weather-vane and provides no dynamic change in motions such that when the vehicle is at speed, or even changing speeds, the display will be largely static.

US2004134410A1 by Yaron et al., describes display devices in the shape of a flag assembly are provided. The display devices are constructed of solid plastic materials that withstand damage caused by contact with air turbulence or adverse weather conditions, particularly when attached to a mount on a moving vehicle, and that withstand detachment from a mount caused by such air turbulence or adverse weather conditions. The display devices allow an observer to openly view a display when a vehicle is stationary or moving, and allow a motorist of another vehicle to view the display while having an unobstructed view of traffic conditions surrounding the vehicle. However, again this device operates similar to a weather-vane and provides no dynamic change in motion with respect to the plastic flag attachment, such that when the vehicle is at speed, or even changing speeds, the display will be largely static.

Other types of vehicles displays, such as customized painted images, bumper stickers or decals have been attempted in the art. These types of displays must be placed on surfaces which can tolerate scratching in case the user wants to remove the sticker or decal. Alternatively, stickers or decals must be placed on a surface which is not aesthetically important where scraping or glue residue may be tolerated. A limitation to the use of these locations or surfaces is that they are typically out of the way or not directly on the normal line of sight of the observer. Thus, these stick on, or adhesive supported displays, suffer from the limitation that they cannot be conveniently placed on surfaces that must hold high quality finishes without negatively impacting the surface finish quality. Still further, the use of displays that are secured by an adhesive creates problems such as unsightly weathering and aging of the sticker itself. Thus, there remains a need for a device that can be easily replaced or removed and stored away from the elements in order to protect the display from weathering.

As such, there remains a need for a system that can be placed at eye level, without harming the mounting surface and which allows variation of the messages to be displayed. Still further, there remains a need for a system that is lightweight and can be easily assembled to produce a consistent, impactful and professional appearance as to alignment and presentation, as well as incorporating dynamic movement to better capture the attention of viewers.

SUMMARY OF THE INVENTION

In one aspect, the inventive technology relates to a novel and unique oscillating display system. In one preferred aspect, the invention may be used to position and support, for example, one or more marketing or advertising displays to a vehicle, or other external surface that is subject to flowing air. The oscillating motion of the display may aid in capturing the attention of potential consumers or the public at large. Moreover, the oscillating motion of the device of the invention may further be educational, as well as and visually stimulating, especially when coupled to a vehicle window within a child's line of sight.

In another aspect, the invention includes a novel oscillating display system configured to allow dynamic oscillation movement of a personalized display in response to an external force, such as airflow generated by the movement of a vehicle. In this preferred aspect, the oscillation movement of a display is controlled by the speed of the vehicle and resulting air flow. The oscillating display system is further configured to allow dynamic oscillation movement of a personalized display in response to an external force, such as air flow generated by the movement of a vehicle or wind, while maintaining the display in an approximately horizontal position relative to an external viewer.

In another aspect, the invention includes a novel oscillating display mounting system having a mount configured to be securable to a vehicle, and preferably a mount having a clip adaptor that can be secured over the top surface of a window. The mount of the invention may be coupled with, or alternatively include an integral stationary handle having an upper collar configured to be secured to a hinge support through one or more fasteners or couplers. The hinge support of the invention, may include one or more coupler positions configured to secure one or more pivot arms. In this preferred aspect, the one or more coupler positions of the hinge support may include one or more extended pins that can be secured to the terminal end of a pivot arm forming a rotatable connection, or hinge—the terms being generally interchangeable as used herein.

In another aspect, the pins or coupler positions of the hinge support may be offset, such that the pivot arms of the invention, when secured to the pins form a plurality of hinges also in an offset configuration. In this preferred aspect, the upper collar of the invention may include a plurality of coupler positions, preferably apertures, configured to receive the pins of the hinge support and secure a plurality of pivot arms forming at least two rotatable upper hinges positioned in an offset configuration. The pivot arms may further be secured to an oscillating display having a lower mount configured to secure one or more pivot arms forming at least two rotatable lower hinges also positioned in an offset configuration. In this aspect, the distance between the plurality of upper hinges is less than the distance between the lower hinges allowing for a greater control and stability of the oscillating movement of the display in response to flowing air.

In another aspect, the invention may include a novel oscillating display mounting system having an aerodynamically responsive display. In this preferred aspect, the oscillating display of the invention may include one or more airfoils to generate lift when subject to an external flow of air. In one preferred aspect, the aerodynamically responsive display may include a model airplane having a plurality of wings and rotatable propeller.

In another aspect, the invention may include a novel oscillating display mounting system that can be adapted to be positioned on either side of a vehicle or external surface. In this embodiment, the hinge support of the invention may include at least three pins positioned in an offset configuration having two upper pins and one lower pin. A front pivot arm of the invention may be coupled with the lower pin, while a second rear pivot arm may be coupled with at least one of the two upper pins. In this configuration, the front and rear pivot arms can be curved to further generate lift when subject to an external flow of air. When placing the device on a different side of the vehicle, the rear pivot arm can be reattached with the lower pin in the opposite orientation with the curve of the arm facing forward. The rear pivot arm may also be flipped so that the curve of the arm is also facing forward and may be recoupled with the opposite upper pin. The upper collar may be reattached with the hinge support and the coupler secured to the opposing window such that the orientation of the display allows for the controlled rearward oscillation movement when subject to an external flow of air on either side of the vehicle.

In another aspect, the invention includes an oscillating display having a mount with a stationary handle configured to be secured to a hinge support through an upper collar. In a preferred aspect, one or more pivot arms may be coupled to the hinge support forming rotatable upper hinges allowing the controlled oscillation of a display rotatably coupled with the one or more pivot arms through a lower rotatable hinge.

In another aspect, the invention includes an oscillating display, and preferably an oscillating display having one or more airfoil components to generate lift, configured to be mounted to the external surface of a vehicle and display one or more marketing or advertising messages. In this preferred aspect, forward acceleration of the coupled vehicle causes the oscillating display to move rearward due to its inertia, while drag from the passing flow of air pulls the display rearward. Lift generated by the oscillating display's airfoil(s) raises the display upward, such that it has a positive angle of attack (AOA) generally. Modulation of the speed of the vehicle will alter the external air flow applied to the display allowing it to oscillate rearward in a controlled manner between approximately 1° and 90° degrees.

Additional objects of the invention will be clear to those of ordinary skill in the art through the figures, description, and claims presented herein.

DETAILED DESCRIPTION OF THE INVENTION

The present invention includes a variety of aspects that together, generally comprise a novel oscillating display mounting device, system and assembly. The described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of disclosed elements with each element alone, and also with any and all various permutations and combinations of all elements in this or any subsequent applications.

The inventive technology described herein includes an oscillating display mounting system (1) configured to allow oscillation of a oscillating display (15) in response to an external force, such as air flow generated by the movement of a vehicle or wind. In a preferred embodiment, the oscillating display (15) may be personalized, such that an individual can select an oscillating display (15) design, and/or an individual marketing or personal message to be displayed. In some embodiments, the oscillating display (15), may include standard configuration and message, or may be generated on a customer order basis individually or in bulk. For example, in one embodiment, a oscillating display (15) may include a corporate logo and slogan, which may be produced individually or in bulk. In other embodiments, the oscillating display (15) may include one or more standard designs, colors, or shapes, which can further be personalized with one or more marketing or personal messages or displays. In still further embodiments, the oscillating display (15) can be a toy or other novelty item which may be produced individually or in bulk.

Figure 1:
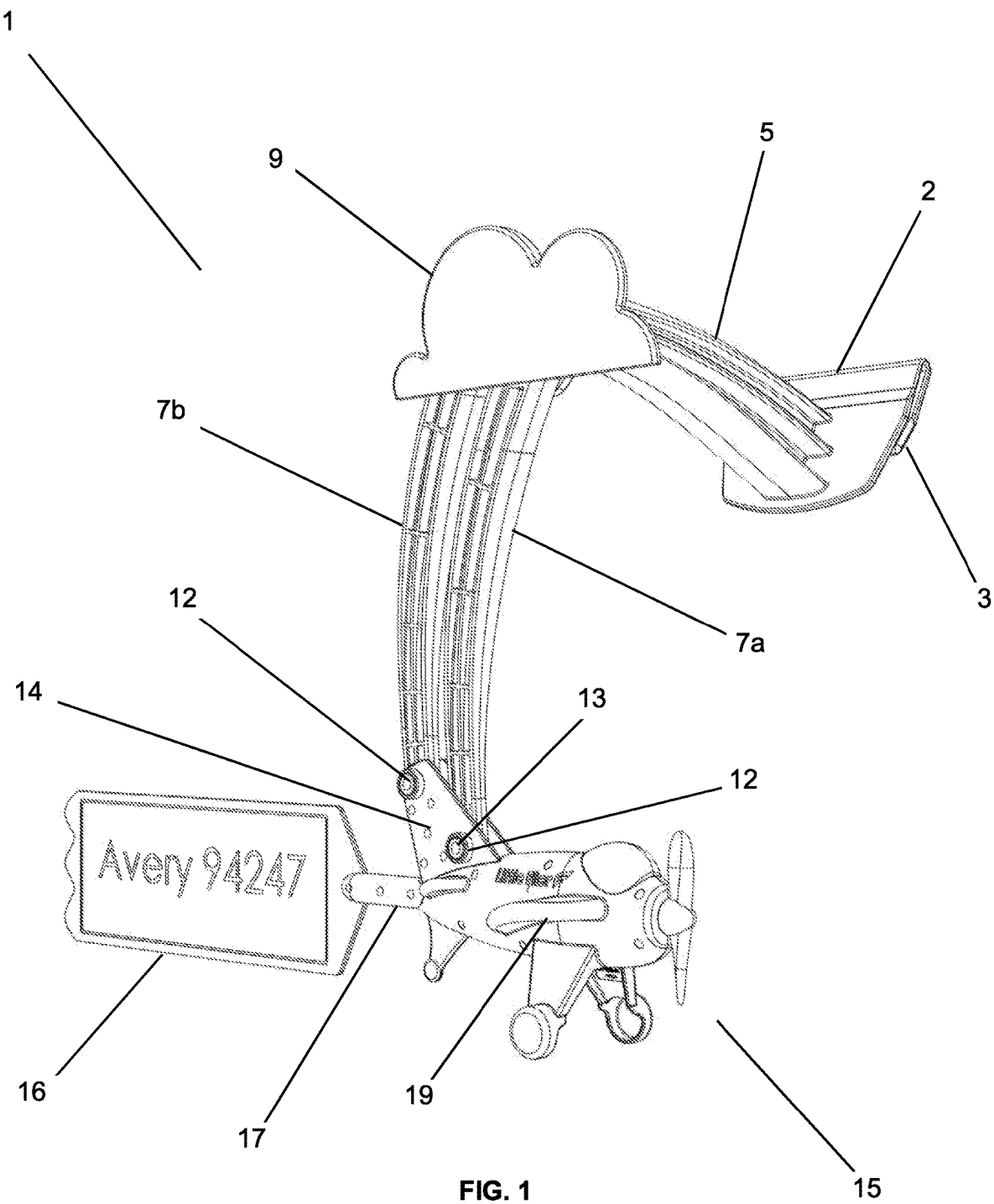
FIG. 1: shows a front perspective view of an oscillating display mounting system in one embodiment thereof.

Generally referring to FIG. 1, the oscillating display mounting system (1) may include a mount (2) or mount assembly. The mount (2) of the invention is configured to be secured to a vehicle or other external surface that may be subject to an external flow of air. In this preferred embodiment, the mount (2) of the invention may be configured to be secured to a window, and in particular along the top surface of a window. Here, the mount (2) may include a clip adapter (3) positioned approximately parallel to the front surface of the mount (2) creating a space to receive the top surface of a window. The mount (2) and clip adapter (3) may be positioned over the top surface of a window, and preferably a vehicle window, and then raised to be secured by the top surface of the vehicle's window frame. The junction between the mount (2) and clip adapter (3) may be pliable allowing it to be secured to windows having variable widths and the like. Additional embodiments may include pads positioned along the interior surface of the mount (2) and/or clip adapter (3) to provide additional support for the mount (2) and coupled assembly as describe below, as well as to prevent scratching or damaging the window's surface.

Notably, in alternative embodiment, the mount (2) of the invention may include a variety of different coupler assemblies that facilitate the attachment of the mount (2) to a vehicle or external surface. For example, in one embodiment, the mount (2) of the invention includes a magnetic mount configured to be secured to a metal surface, such as the roof, or door of a vehicle. While in alternative embodiments, the mount (2) of the invention may include a suction cup configured to be secure to an external surface. In still further embodiments, the mount (2) of the invention may include a separable mounting component that may be secured to an external surface, such as through an adhesive, magnet or suction cup and that may secure one or more components of the oscillating display mounting system (1) as described below.

Figure 2:
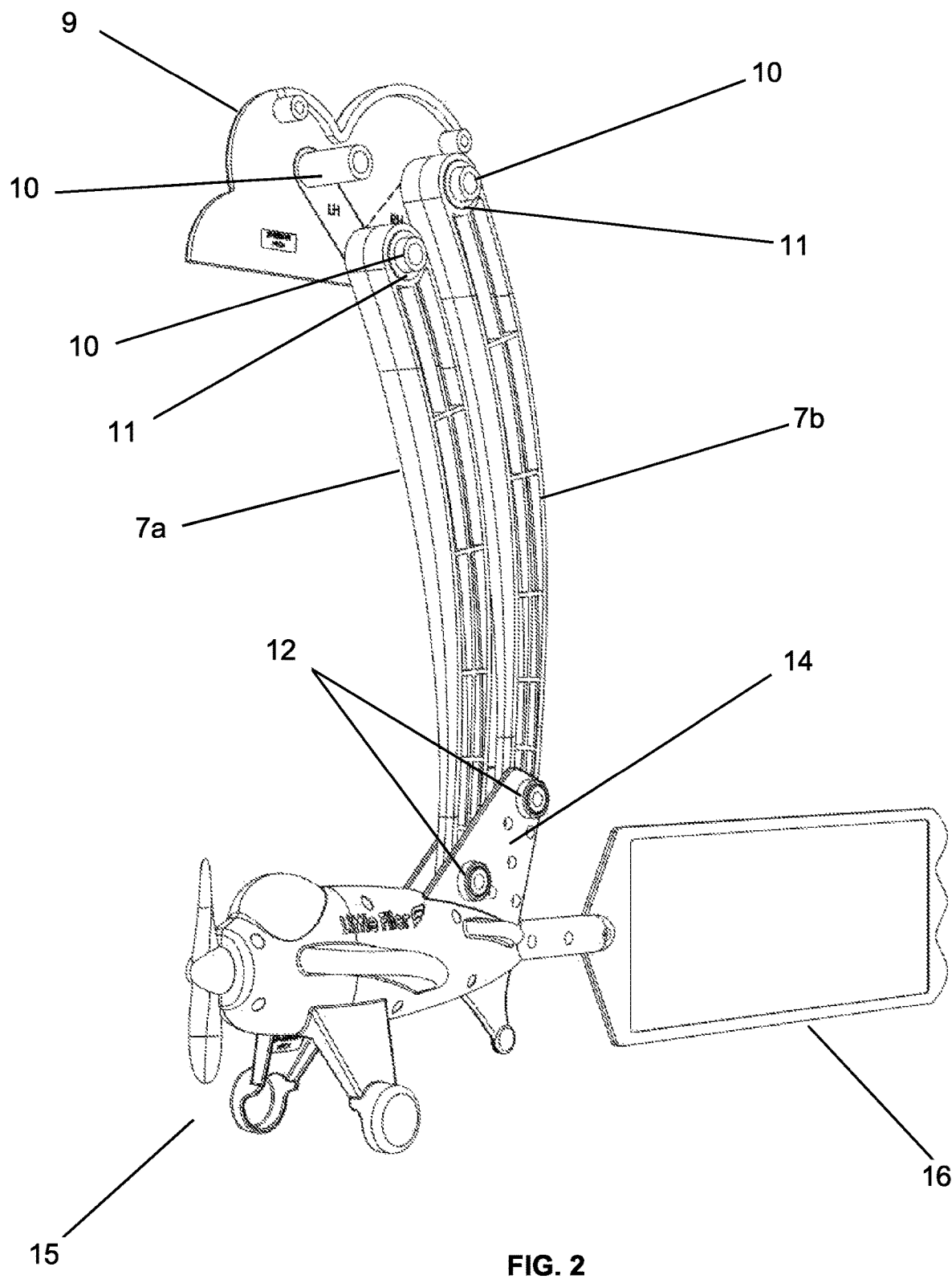
FIG. 2: shows a back perspective view of a hinge support coupled with a plurality of pivot arms through a plurality of rotatable upper hinges securing an exemplary oscillating display through a plurality of lower rotatable hinges, both sets of hinges being in an offset configuration in one embodiment thereof.
Figure 3:
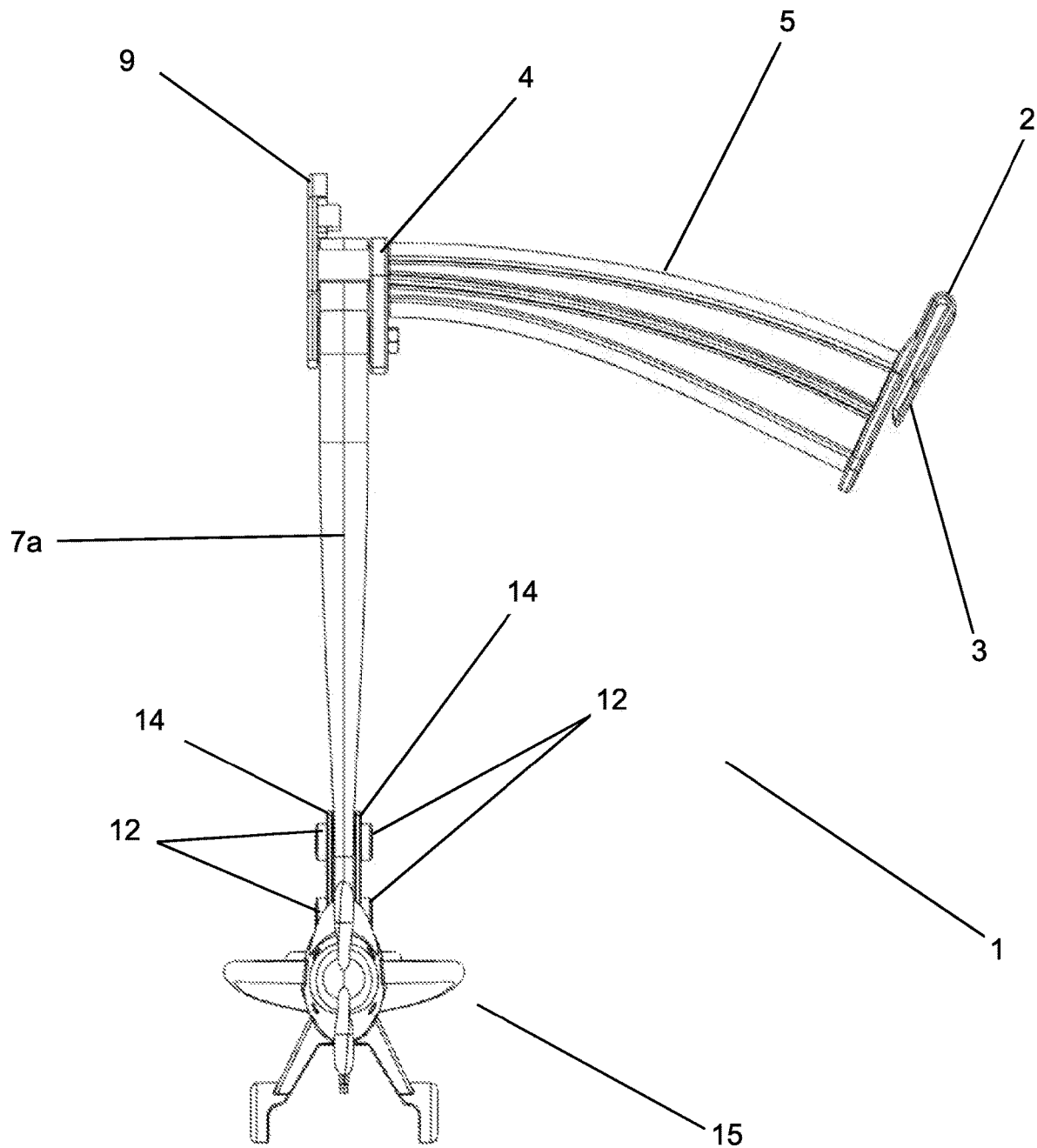
FIG. 3: shows a front view of an oscillating display mounting system in one embodiment thereof.
Figure 4:
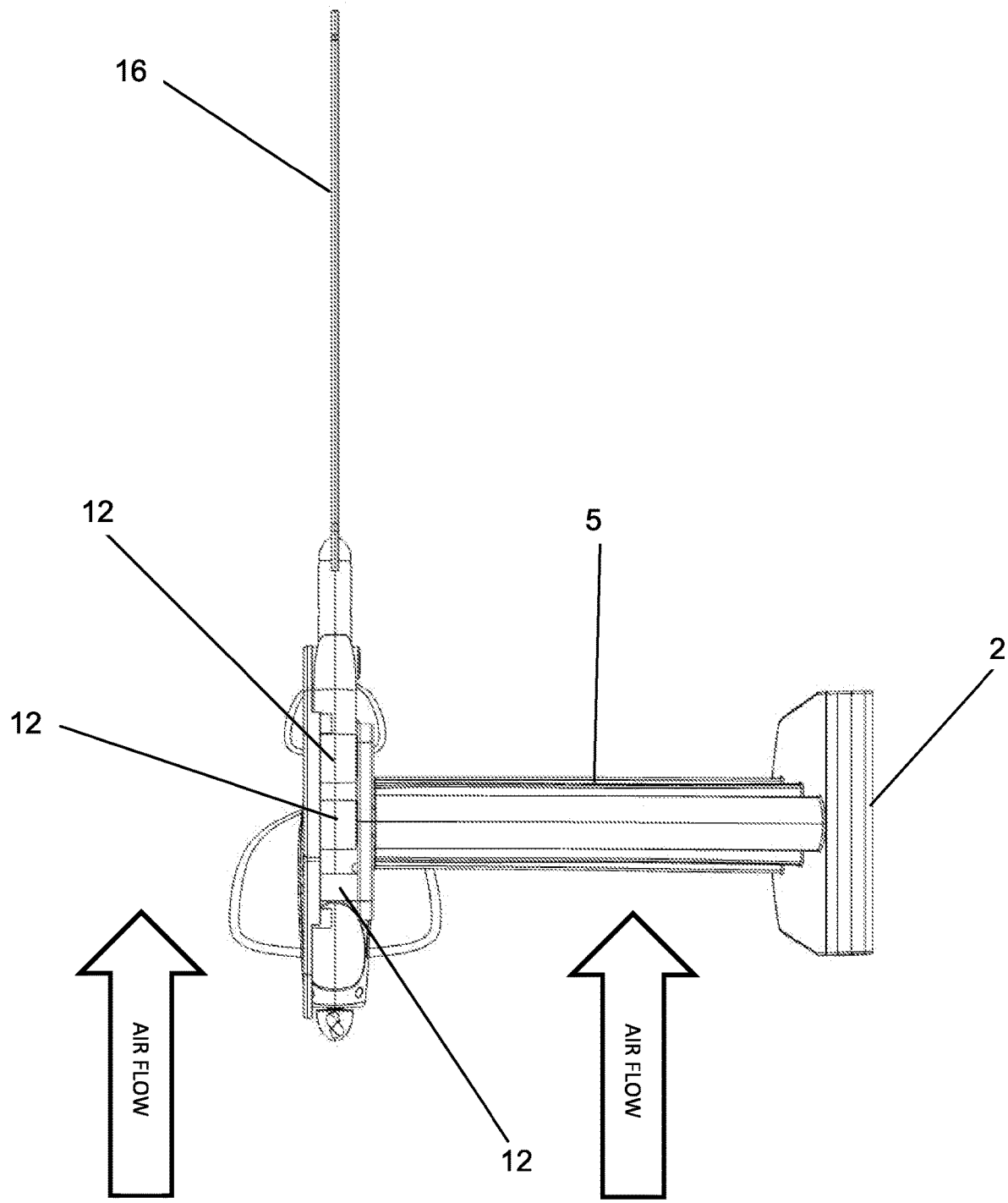
FIG. 4: shows a top view of an oscillating display mounting system in one embodiment thereof.
Figure 5:
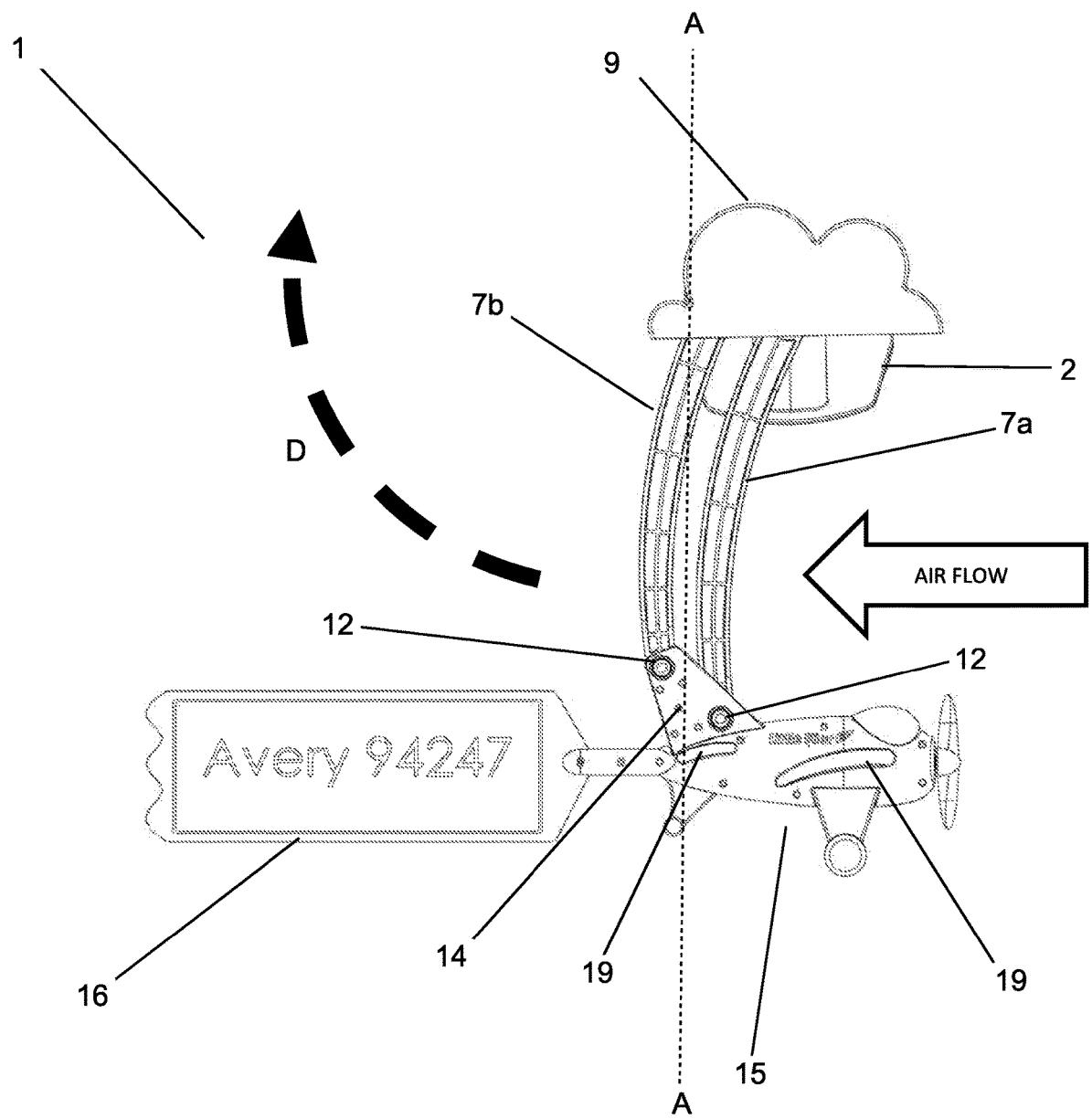
FIG. 5: shows a front view of an oscillating display mounting system and the direction of air flow and oscillation pathway, with the oscillating display positioned at the bottom of the oscillation pathway, of the exemplary display in one embodiment thereof.

The oscillating display mounting system (1) may further include a stationary handle (5). As generally shown in FIGS. 1-3, the stationary handle (5) of the invention may be secured to, or integral with the mount (2) and extend away from the mount (2) in an approximately horizontal manner. In this embodiment, the stationary handle (5) allows the components of the oscillating display mounting system (1) to be positioned away from the window surface of the vehicle, or other external surface such that the oscillating display (15) does not interfere with the up and down operation of the window, and to position the oscillating display (15) into an unobstructed flow of air so as to generate the dynamic oscillating movement of the display (15) described herein.

The oscillating display mounting system (1) may further include a hinge support (9). As generally shown in FIGS. 1-2, 6-7, and 13, the hinge support (9) of the invention may include a front and rear surface. The hinge support (9) of the invention may be secured to the stationary handle (5) by one or more fasteners, such as a threaded screw, or other coupler assembly such as a snap coupler, a pronged coupler, a pin coupler, a twist coupler, and a slide coupler. In other embodiments, the two elements may be a unitary integral component.

As shown in FIG. 1, the front surface of the hinge support (9) may face away from the mount and be within the line of sight of a viewer. In this configuration, the front surface of the hinge support (9) may include a personalized marketing display or message such as personalized script promoting a product, a personal name or group affiliation, as well as personalized artwork and other visual displays. As noted in the figures, the hinge support (9) may include a variety of shapes and sizes, that may also be personalized to a user's need or commercial application. For example, in the embodiment shown in the figures, the hinge support (9) is in the shape of a stylized "cloud." However, in alternative embodiments, the hinge support (9) may be in the form of a geometric shape, a corporate logo, or an article of manufacture, such as a ball or other sports article such as a helmet and the like.

Figure 6:
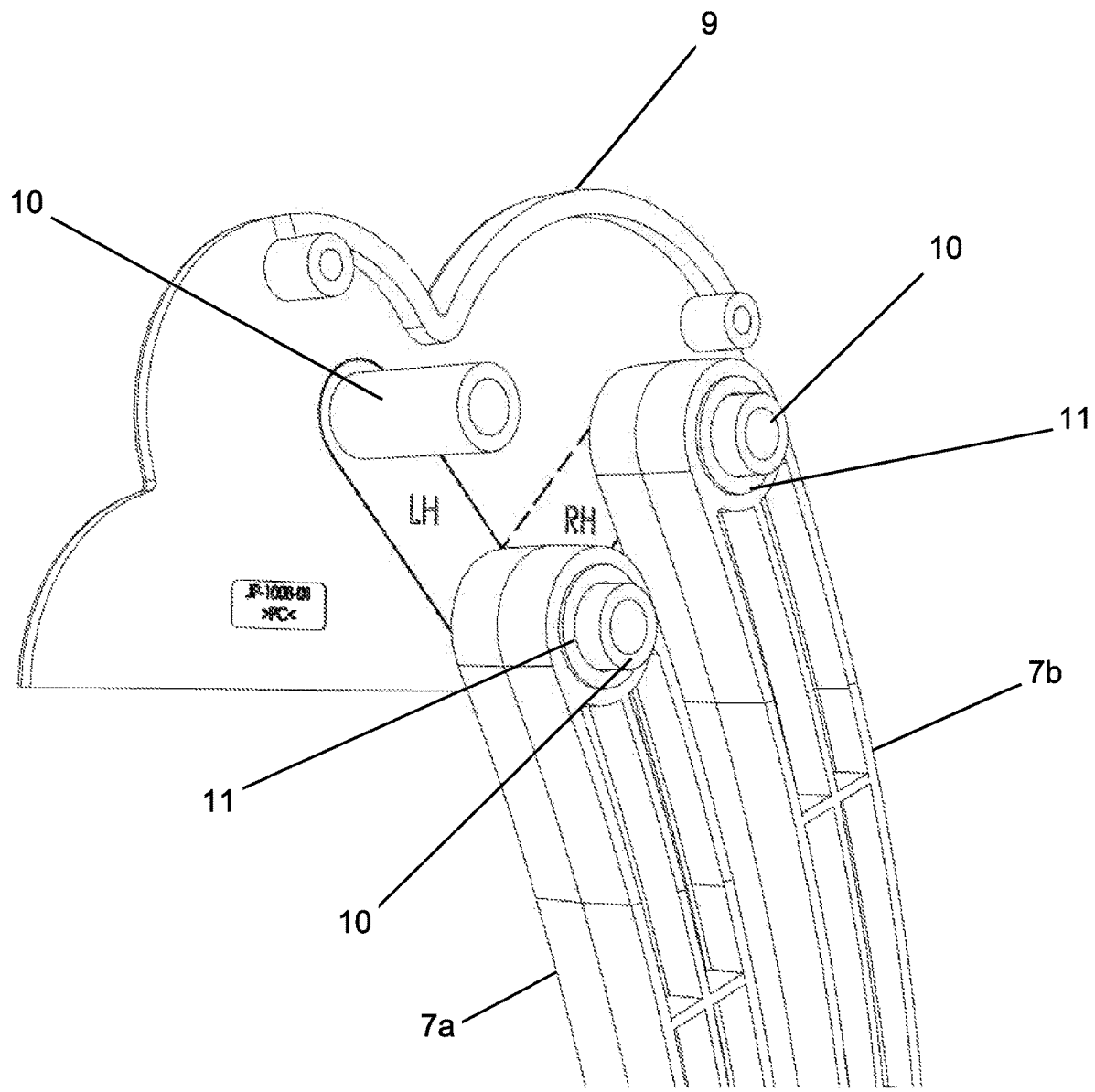
FIG. 6: shows an isolated perspective view of a hinge support coupled with a plurality of pivot arms through a plurality of offset pins in one embodiment thereof.

The oscillating display mounting system (1) may further include one or more pivot arms (7). In the preferred embodiment shown in the Figures, the invention may include a front pivot arm (7a) and a rear pivot arm (7b) that secure an oscillating display (15). The front pivot arm (7a) and a rear pivot arm (7b) may further be curved, as well as have an extended width to provide supplementary lift when an external air flow is applied to the assembly. The pivot arms (7) of the invention may further include terminal apertures (8) at their proximal and distal ends. As shown in FIG. 6, the terminal apertures (8) of a pivot arm (7) of the invention may be positioned over a pin (10) on the rear surface of the hinge support (9) forming a rotatable upper hinge (11). In some embodiments, a bearing (not shown) may be positioned between the pin (9) and terminal aperture (8) of the pivot arm (7) to facilitate the rotational movement of the same. Notably, while the preferred embodiment shown in the figures employs a pin and aperture coupling, alternative embodiments include coupling devices, such as a pronged coupler, configured to secure the pivot arm (7) to the hinge support (9) such that it can freely rotate in response to an external air flow.

Figure 8:
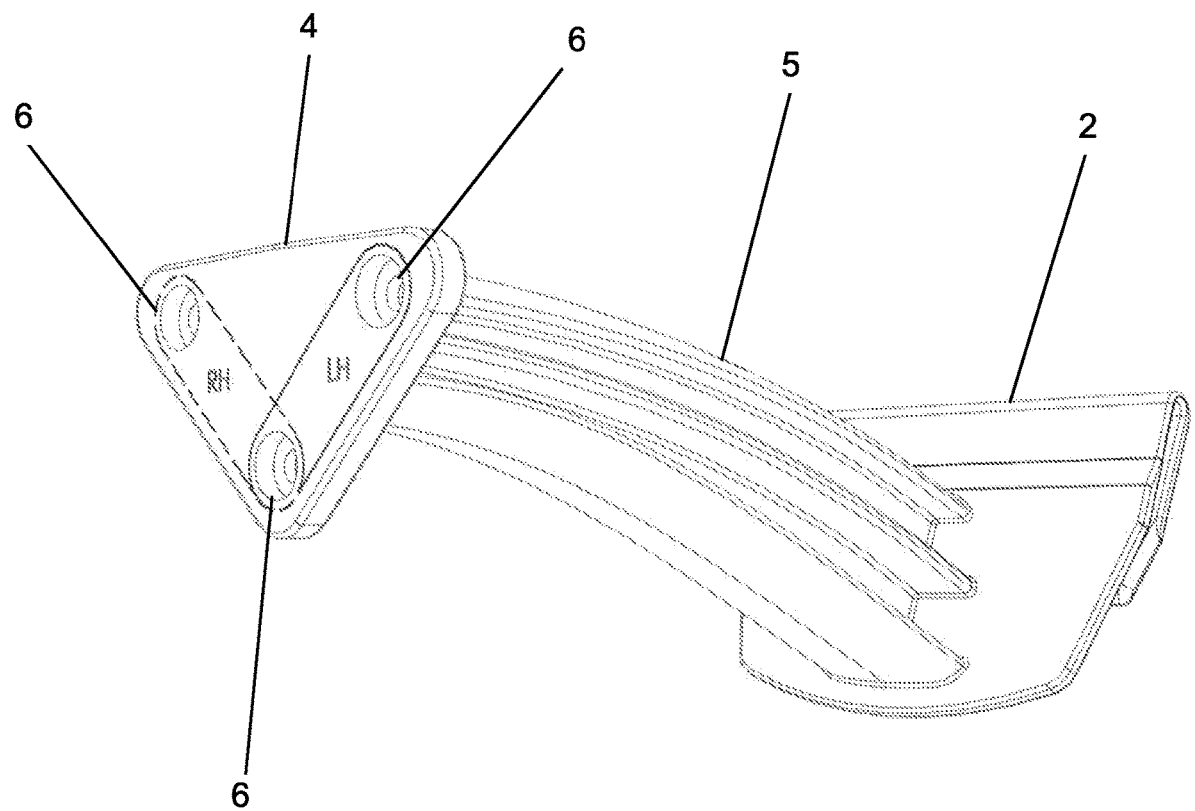
FIG. 8: shows an isolated perspective view of upper collar having a plurality of aperture coupler positions, further secured to a stationary handle and mount in one embodiment thereof.
Figure 9:
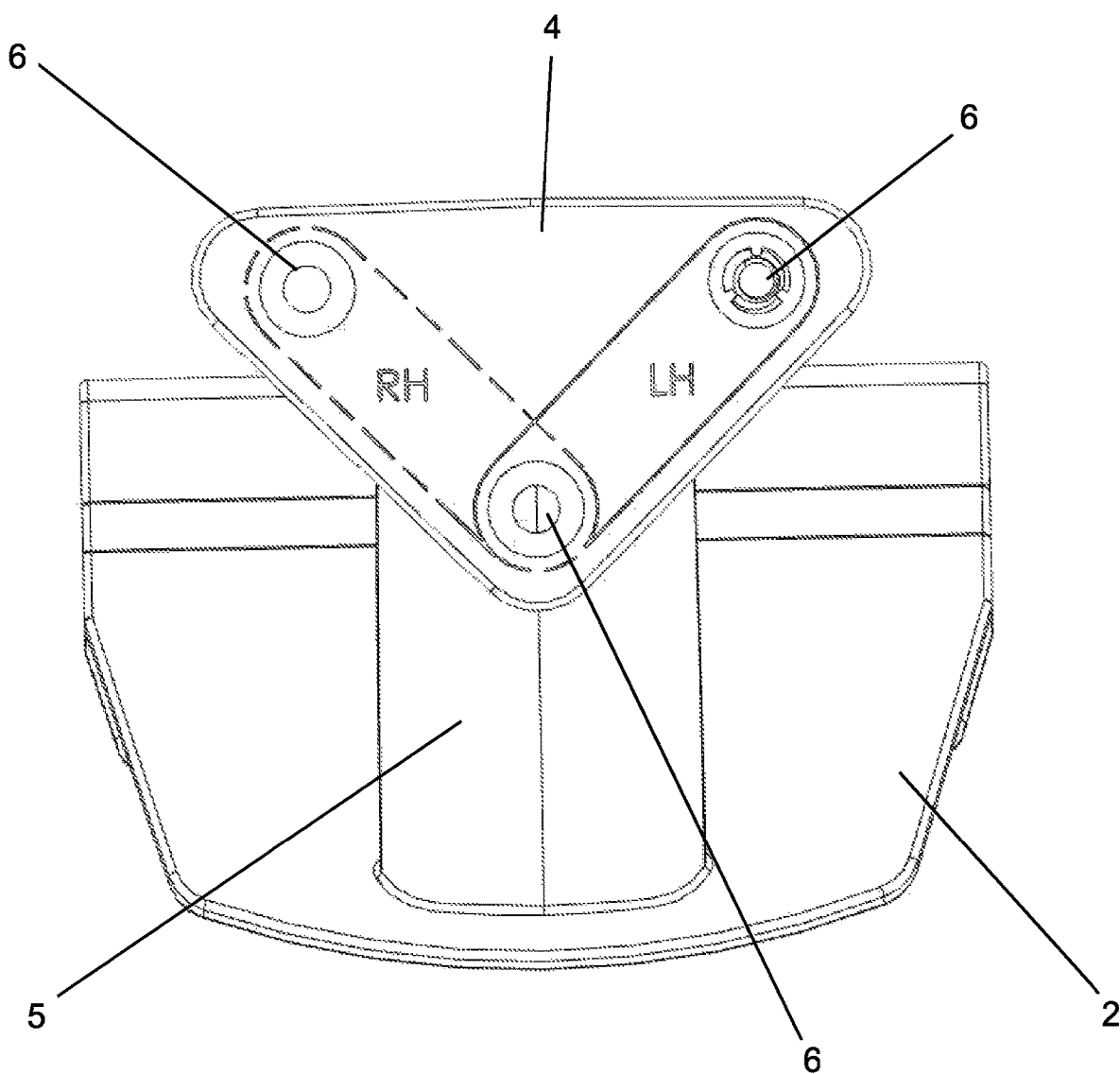
FIG. 9: shows an isolated front view of upper collar having a plurality of aperture coupler positions, further secured to a stationary handle and mount in one embodiment thereof.

As shown in FIG. 8, the upper collar (4) of the invention may be secured to the rear surface of the hinge support (9) and may further include one or more coupler positions (6) configured to be positioned over the pins (10) of the invention. In this preferred embodiment, the terminal apertures (8) of a pivot arm (7) of the invention may be positioned over a pin (10) on the rear surface of the hinge support (9) forming a rotatable upper hinge (11) and are further secured by coupling the upper collar (4) to the hinge support (9) such that the pins are received into the coupler positions (6), preferably being apertures in this embodiment. The internal surfaces of the pins (10) and/or coupler positions (6) may be threaded so as to receive a fastener, such as a threaded screw configured to couple the upper collar (4) to the hinge support (9).

Referring again to FIGS. 6-7, in a preferred embodiment, the rear surface of the hinge support (9) of the invention may include one or more coupler positions configured to rotatably secure a pivot arm (7) as described below. The rear surface of the hinge support (9) includes a plurality of pins (10) positioned in an offset configuration, which may include three pins, with two upper pins and a single lower pin. In the preferred embodiment demonstrated in the figures, a front pivot arm (7a) may be secured to a lower pin (10) on the rear surface of the hinge support (9), while a rear pivot arm (7b) may be secured to one of the upper pins (10) such that the pivot arms (7a, 7b) are paired with their curved surfaces facing forward into the direction of the external air flow. As shown in FIG. 6, in this preferred arrangement the two upper hinges are positioned in an offset configuration.

Figure 7:
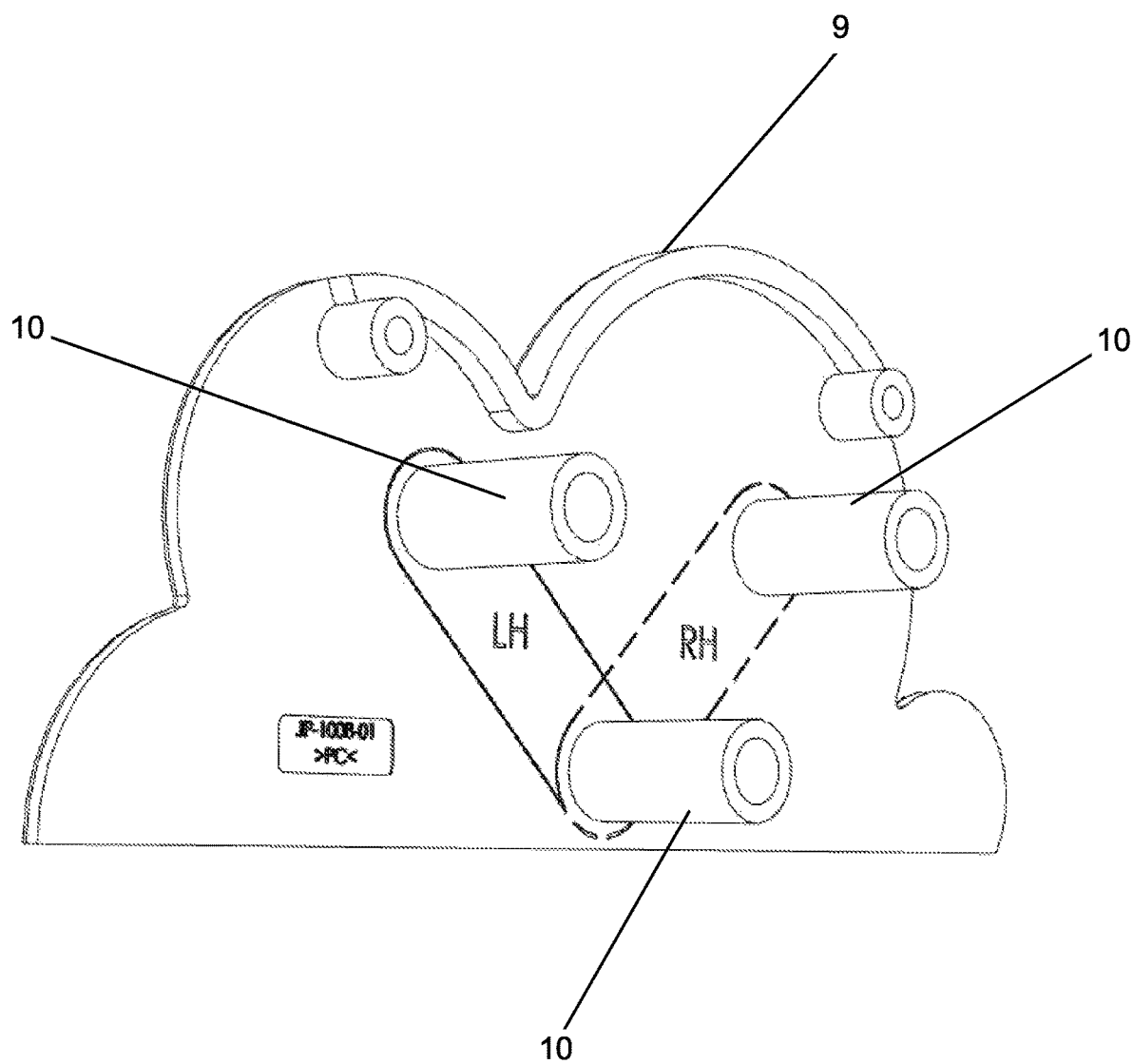
FIG. 7: shows an isolated view of a hinge support having a plurality of pins in an offset configuration with a single lower pin and two opposing upper pins in one embodiment thereof.

As noted above, the offset configuration of pins (10) on the rear surface of the hinge support (9) allows for the coupling of two pivot arms (7) in either a left or right hand manner as generally highlighted in FIGS. 6-7, wherein LH is identified as the two pins needed to position the oscillating display mounting system (1) of the invention on the "left" side of a vehicle or surface such that the curved pivot arms (7) supporting the oscillating display (15) face forward into the air flow. Conversely, RH is identified as the two pins needed to position the oscillating display mounting system (1) of the invention on the "right" side of a vehicle or surface such that the curved pivot arms (7) supporting the oscillating display (15) face forward into the air flow.

The oscillating display mounting system (1) may further include one or more oscillating displays (15). As shown in the figures, in one embodiment the oscillating display (15) of the invention is a model airplane, having a plurality of airfoils (19) as well as a rotating propeller (20) secured to a rotatable shaft (18). Notably, this embodiment is exemplary only as a variety of oscillating displays (15) may be considered within the scope of the invention.

In certain embodiments, the oscillating display (15) of the invention may be a marketing communication such as a geometric shape, corporate logo, article of manufacture, or a personalized verbal or artistic representation. In certain embodiments, the oscillating display (15) may be a toy or other eye-catching article of manufacture, that may be further coupled with a secondary display (16) through one or more couplers (17), which can include additional marketing communications such as geometric shapes, corporate logos, articles of manufacture, or personalized verbal or artistic representations. In this configuration, the secondary display (16) can be removed, added, interchanged, or customized separately to personalize the appearance of the oscillating display (15) of the invention. In this embodiment, the secondary display (16) may be secured to oscillating display (15) by a coupler (17), such as a snap coupler, slide coupler, a pin coupler, a quick release coupler, and the like. In additional embodiments, the coupler (17) of the invention may include a securement point to secure a banner, flag or other novelty item with wire, string, rubber bands or other securement materials.

The oscillating display (15) of the invention may optionally include one or more airfoils (19) positioned so as to generate lift when an external air flow is applied to the display, allowing it to move along its oscillation path (D) relative to a midline (A).

Additional embodiments may include powered oscillating displays, having lights or digital text and images that may be pre-programed, or input by a user. In this embodiment, a digital display may be responsive to a power source, such as a battery or solar panel, and may further be responsive to a controller configured to execute a computer executable program to control the digital display. In another embodiment, the oscillating display (15) of the invention may be configured to generate electricity sufficient to power one or more digital displays. In this embodiment, a propeller (20) may be secured to a rotatable shaft (18) that may rotate in response to an external air flow. The terminal end of the rotatable shaft (18) may be configured to be part of a motor such that the rotatable shaft acts as rotor positioned with a stator to generate electrical power, which can be used to power a controller configured to execute a computer executable program to control the digital display, such as a digital screen, lights or the like.

Figure 10:
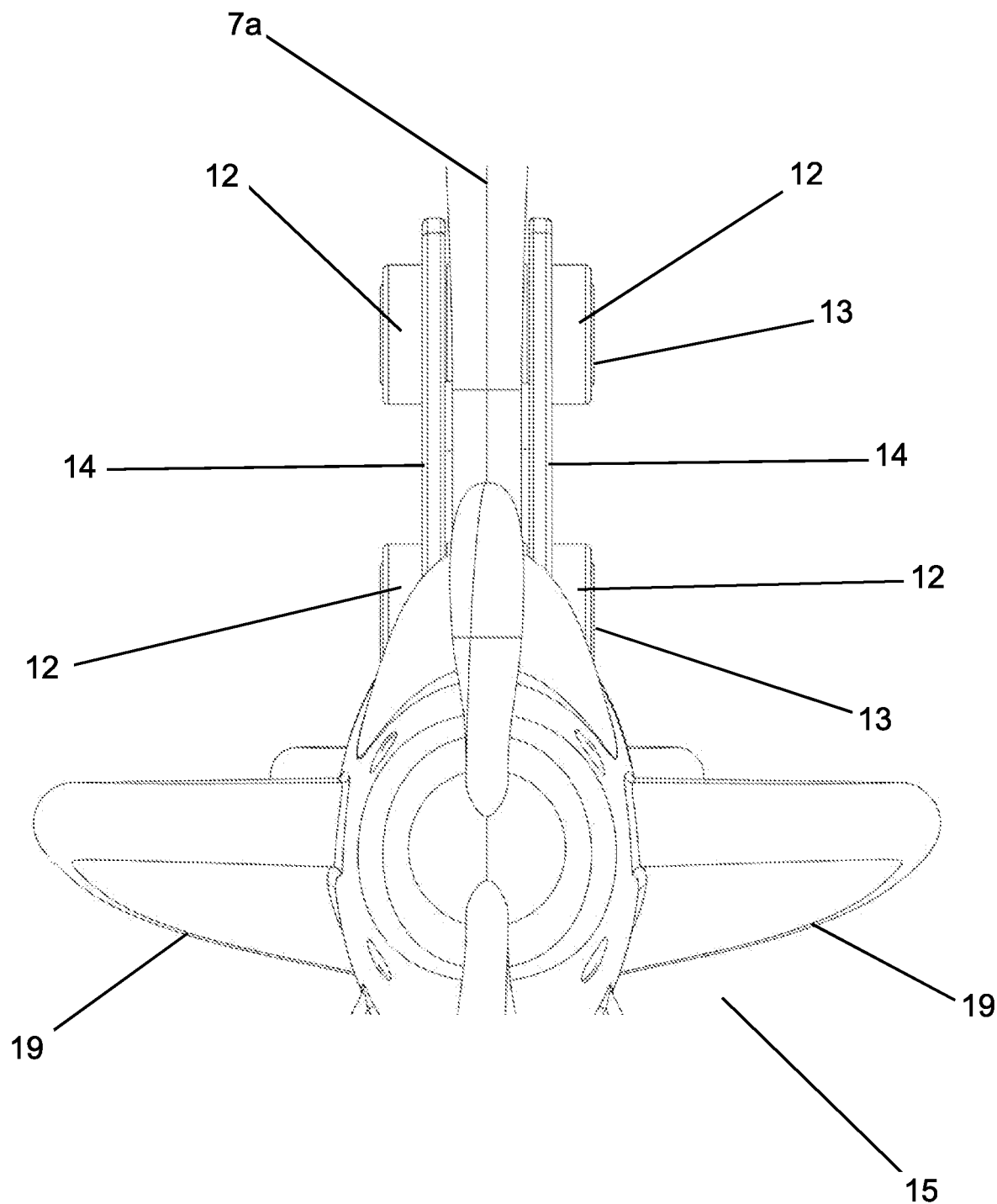
FIG. 10: shows an isolated front view of a an exemplary oscillating display coupled with a front and rear pivot arms through a pair of offset lower hinges in one embodiment thereof.

The oscillating display (15) of the invention may be rotatably coupled with one or more pivot arms (7). In this preferred embodiment, the oscillating display (15) of the invention may include a lower mount (14) having one or more coupler positions configured to secure one or more pivot arms (7). In the preferred embodiment shown in FIGS. 10-11, the terminal aperture (8) of a pivot arm (7) may be coupled to a lower mount (14) through a fastener (13) forming a lower hinge (12). In this configuration, the fastener may be a coupler, pin or other extension coupling the terminal portion of a pivot arm (7), preferably having a terminal aperture (8), forming a rotatable lower hinge (12) or connection.

Figure 11:
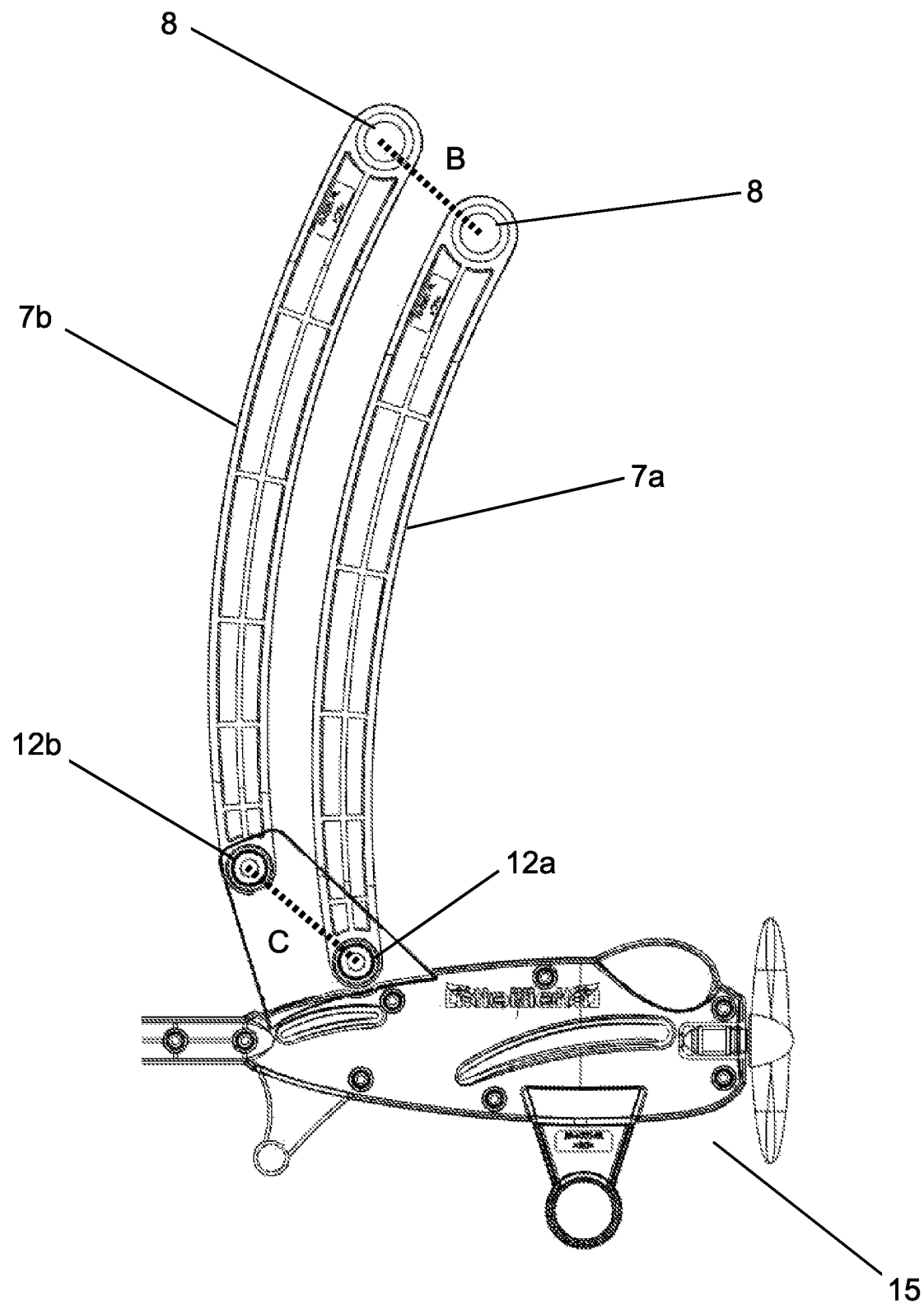
FIG. 11: shows an isolated side view of an exemplary oscillating display coupled with a front and rear pivot arms through a pair of offset lower hinges in one embodiment thereof.
Figure 12:
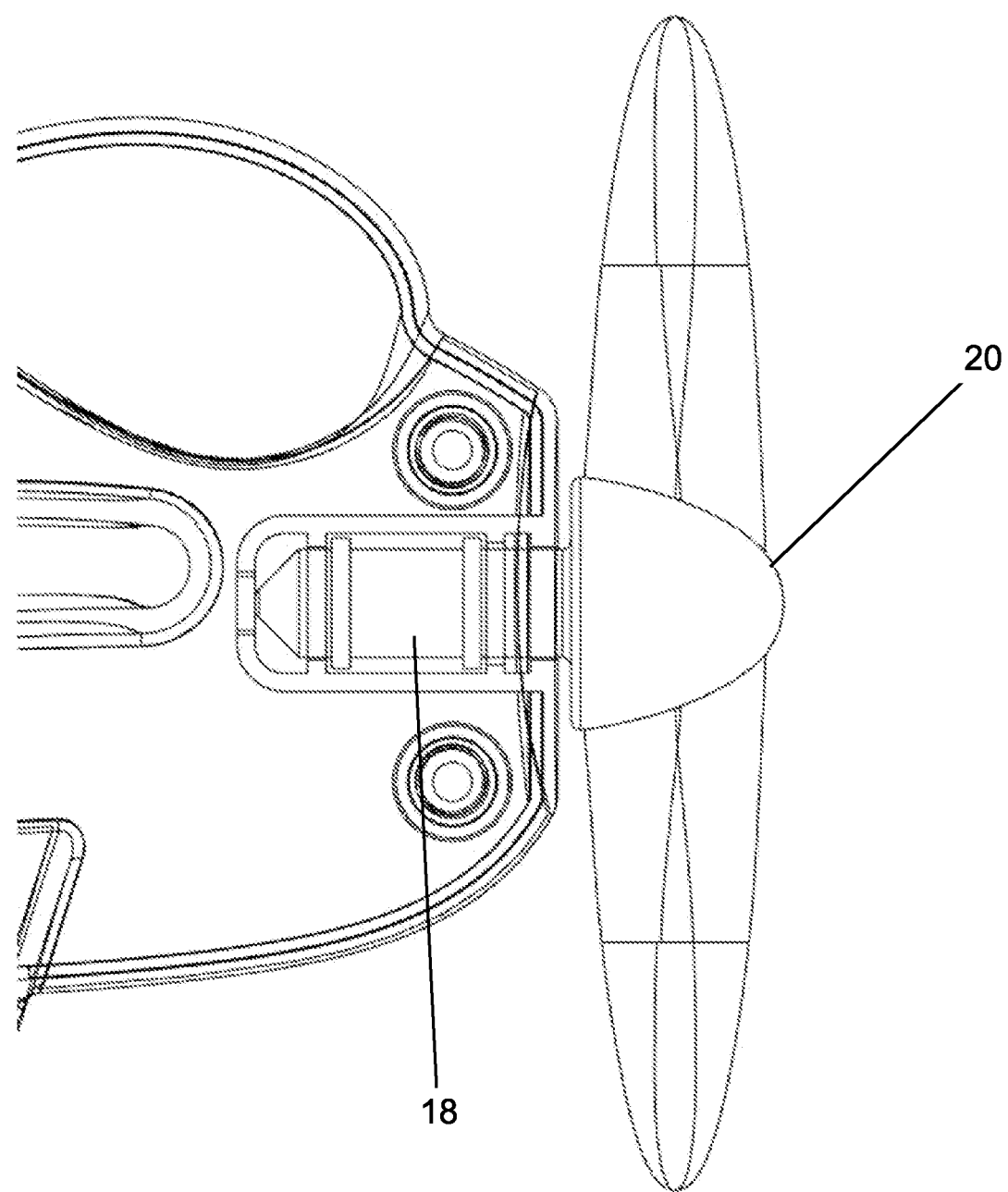
FIG. 12: shown an isolated view of an exemplary oscillating display having a propeller coupled with a rotatable shaft internally secured by said display in one embodiment thereof.
Figure 13:
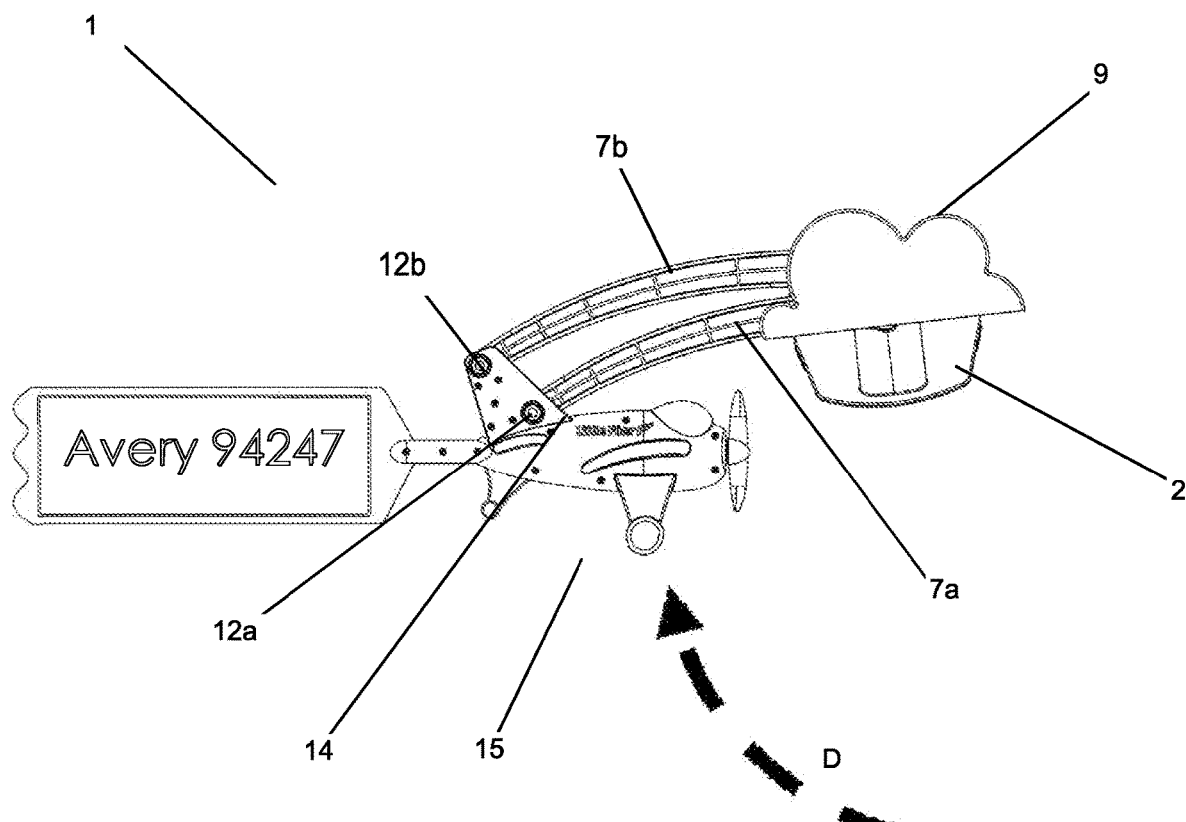
FIG. 13: shows a front view of an oscillating display mounting system and the direction of air flow and oscillation pathway, with the oscillating display positioned at the top of the oscillation pathway, in one embodiment thereof.

As further shown in FIG. 11, the lower hinges (12) may be positioned in an offset configuration, with a front lower hinge (12a) being positioned below a rear lower hinge (12b). A front pivot arm (7a) may be coupled with a front lower hinge (12a), while the rear pivot arm (7a) may be coupled with a rear lower hinge (12b), with the curved portions of the pivot arms (7a, 7b) facing forward. In this configuration, the oscillating display (15) of the invention is secured to an offset set of upper hinges (11) in either a left, or right orientation, while further being coupled to a corresponding offset set of lower hinges (12). In this configuration, the oscillating display (15), in response to an external air flow, may move along the oscillation path (D), which may include an oscillation movement between approximately 1° and 90° degrees or from a midline (A), or alternatively between approximately −20° and 90° degrees from a midline (A). Such ranges being exemplary only.

In a further preferred embodiment, the spacing between the upper hinges (B) is less than the spacing between the lower hinges (C). In this configuration, the movement of the oscillating display (15) along the oscillation pathway (D) can be initiated at a slower speed and further exhibit greater stability at the top of the oscillation pathway (D) when the external air force is strongest. For example, in one embodiment, spacing between the two upper hinges (B) may be 1.4", while the spacing between the two lower hinges (C) is 1.5". This differential spacing yields an approximate 10° degree reduction in Angle of Attack (AOA) when the oscillating display (15) is at the approximate top of its oscillation pathway (D). This configuration further positions the front portion oscillating display (15), in a positive AOA position at the bottom of the oscillation pathway (D) when there is no external air flow applied to the device, such as when a vehicle is a car at rest or there is no external wind present in the environment. As an external air flow is applied to the oscillating display (15), the pivot arms (7) rotate such that the display (15) travels along its oscillation pathway (D) to a position where front portion of the oscillating display (15) is approximately horizontal, having a minimal positive AOA. In this manner, the oscillating display (15) is maintained in an approximately horizontal position regardless of its position along the oscillation pathway (D), and will further dynamically move up or down the pathway as the external air flow increases or decreases.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to accomplish an oscillating display mounting system and the like. In this application, the methods and apparatus for the aforementioned systems are disclosed as part of the results shown to be achieved by the various devices described and as steps which are inherent to utilization. They are simply the natural results of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system. In this application, the techniques are disclosed as part of the results shown to be achieved by the various devices described and as steps which are inherent to utilization. They are simply the natural results of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention may be described in some instances in method-oriented terminology, each element of the claims corresponds to a device and vice versa. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "supporting method and/or technique, and/or device" and even a "means for supporting." Such changes and alternative terms are to be understood to be explicitly included in the description. Any patents, publications, or other references mentioned in this application for patent, such as in the specification or an IDS are hereby incorporated herein by reference in their entirety. Any priority case(s) claimed by this application is hereby appended and hereby incorporated herein by reference in their entirety.

Thus, the applicant(s) should be understood to have support to claim and make a statement of invention to at least: i) each of the methods and/or apparatus for providing a oscillating display mounting system as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

Finally, Applicant reserves the right to seek additional design patent protection over the claimed invention, such that the drawings are fully enabled so as to allow one of ordinary skill in the art to know that the claimed design was in Applicant's possession at the time of filing. As such, it should be noted that any broken lines are to be included for the purpose of illustrating environmental matter and form no part of the claimed design should such become necessary.

What is claimed is:

1. An oscillating display mounting system comprising:
   a mount having a stationary handle, said mount being securable to a vehicle;
   a hinge support having at least three pins positioned in an offset configuration;
   at least two pivot arms, each having a terminal aperture configured to be rotatably secured with a pin of said hinge support;
   an upper collar having a plurality of coupler positions configured to receive the pins of said hinge support and secure the pivot arm forming at least two rotatable upper hinges positioned in an offset configuration;
   an oscillating display having a lower mount configured to secure said pivot arms forming at least two rotatable lower hinges positioned in an offset configuration, said oscillating display optionally having one or more airfoils; and
   wherein the distance between the plurality of upper hinges is less than the distance between the lower hinges.

2. The system of claim 1, wherein said mount comprises a window mount.

3. The system of claim 2, wherein said window mount comprises a clip adaptor configured to be secured over the top surface of a window.

4. The system of claim 1, wherein said mount, stationary handle and said upper collar comprise an integral component.

5. The system of claim 1, wherein said pivot arms are curved.

6. The system of claim 1, wherein said rotatable upper hinges further comprise a bearing.

7. The system of claim 1, wherein said plurality of coupler positions comprise a plurality of apertures configured to receive the pins of said hinge support.

8. The system of claim 1, wherein said hinge support and upper collar are secured by a fastener.

9. The system of claim 1, wherein said rotatable lower hinges further comprise a coupler configured to secure said pivot arms with said lower mount.

10. The system of claim 9, wherein said coupler comprises a coupler selected from the group consisting of a pin coupler, a snap coupler, a twist coupler, a quick release coupler, a slide coupler, or a combination of the same.

11. The system of claim 1, and further comprising a secondary display coupled with said oscillating display.

12. The system of claim 1, wherein said secondary display comprises a secondary display selected from the group consisting of: a marketing surface, a geometric shape, a marketing display, a flag, a banner, a toy, or a combination of the same.

13. The system of claim 1, wherein said oscillating display comprises an oscillating display selected from the group consisting of: a marketing surface, a geometric shape, a marketing display, a flag, a banner, a toy, or a combination of the same.

14. The system of claim 1, wherein said oscillating display comprises an airplane model having a rotatable propeller airplane.

15. The system of claim 1, wherein said pins positioned in an offset configuration comprise three pins having two upper pins and one lower pin.

16. The system of claim 15, wherein a front pivot arm is coupled with said lower pin, and a rear pivot arm is coupled with at least one of said two upper pins.

17. The system of claim 1, wherein said oscillating display oscillates approximately between 1° and 90° degrees from a midline.

18. The system of claim 17, wherein said oscillating display is maintained approximately horizontal during oscillation.

19. An oscillating display comprising:
   a mount;
   a stationary handle secured to said mount;
   a hinge support securable to said stationary handle through an upper collar;
   one or more pivot arms coupled to said hinge support forming one or more rotatable upper hinges; and
   an oscillating display coupled with one or more of said pivot arms forming one or more lower rotatable hinges.

20. An oscillating display mounting assembly comprising:
   a window mount having a clip adaptor and a stationary arm;
   a hinge support having three pins positioned in an offset configuration having two upper pins and one lower pin;
   a front pivot arm having a terminal aperture coupled with said lower pin, and a rear pivot arm having a terminal aperture coupled with at least one of said two upper pins;
   an upper collar having a plurality of coupler positions, being apertures configured to receive the pins of said hinge support and secure the front and rear pivot arms securing at least two offset rotatable upper hinges;
   an oscillating display, optionally having one or more airfoils, further including a lower mount configured to secure said front and rear pivot arms forming two rotatable lower hinges positioned in an offset configuration, wherein the distance between the plurality of upper hinges is less than the distance between the lower hinges; and
   wherein said oscillating display is maintained approximately horizontal during oscillation.

* * * * *